INVENTORS
WALTER FARRAR
JACK L. LEONARD
BY
Watson, Cole, Grindle & Watson
ATTORNEYS

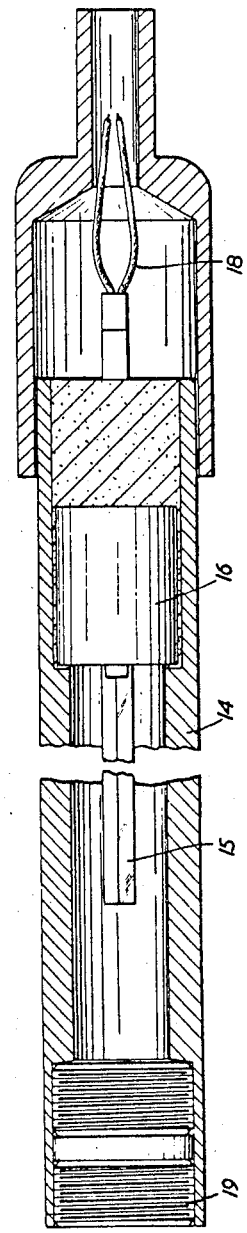
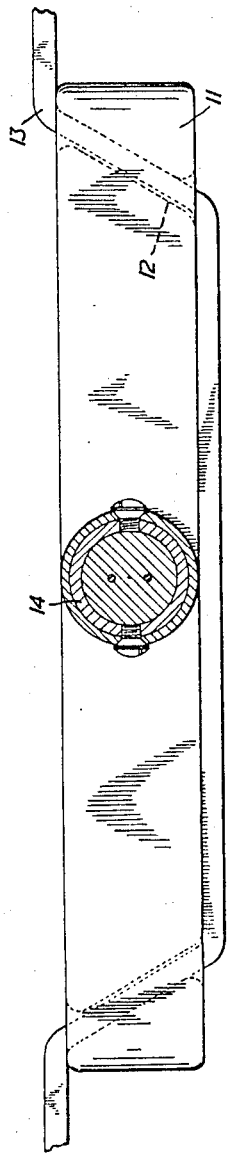
FIG. 2.
FIG. 3.
INVENTORS
WALTER FARRAR
JACK L. LEONARD

3,187,098
FOETAL HEART-BEAT DETECTOR
Walter Farrar and Jack Lawrence Leonard, Edinburgh, Scotland, assignors to Bruce Peebles & Co., Limited, Edinburgh, Scotland, a company of Great Britain
Filed Mar. 28, 1962, Ser. No. 183,252
Claims priority, application Great Britain, Mar. 30, 1961, 11,860/61
5 Claims. (Cl. 179—1)

This invention relates to a foetal heartbeat detector enabling existence of the foetal heartbeat to be readily detected without continuous surveillance.

According to the present invention a foetal heartbeat detector includes a unit for mounting against the mother's body and containing a vibratory member having a natural vibration frequency above about 50 cycles per second.

There is evidence that there is a significant difference in the power spectra of the maternal and foetal heartbeat pulses. Whereas the major part of the energy in the mother's pulse is at frequencies below about 50 cycles per second, the major part of the energy in the foetal heatbeat pulse is above about 50 cycles per second. The vibratory member which responds only to frequencies above about 50 cycles per second makes it possible to discriminate between the maternal and foetal heartbeats. The natural frequency of vibration of the member is preferably about 57 cycles per second, but may be higher.

Conveniently the unit is in the form of a slab which can be held against the mother's body for example by use of an elastic belt and the vibratory member is mounted in a cavity in the slab, for example it may be secured in a capsule snugly positioned in the cavity. The capsule may include a viscous damping fluid.

A preferred form of vibratory member is a piezo-electric crystal in the form of a rod mounted in cantilever fashion. Opposed faces can carry electrical conductors so that a voltage can be derived having a frequency equal to that of the vibrations.

It is convenient to have a pre-amplifier positioned adjacent the unit so that the signals can be amplified near the source to ensure a maximum signal to noise ratio. In any case, a main amplifier can have provisions for delivering amplified output to a loud-speaker, ear-phones, or a lamp, or combinations of these.

The invention may be carried into practice in various ways and one embodiment will now be described by way of example with reference to the accompanying drawings, in which:

FIGURE 2 is a sectional elevation of a preferred form of detector unit; and

FIGURE 3 is a sectional end elevation of the same unit.

Figure 1:
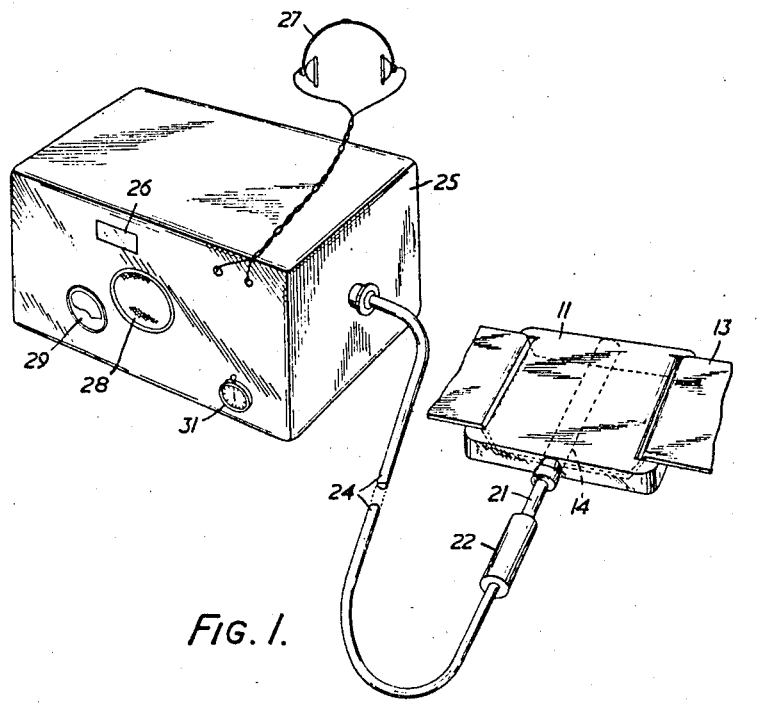
FIGURE 1 is a sketch showing the general arrangement of the equipment.

The detector unit comprises a smooth perspex block 11 with dimensions of about 3½" by 2½" by ⅜" thick. It has a pair of inclined grooves 12 enabling a strap 13 to hold the unit against the body of the mother.

Extending through the block from one end to the other transversely to the direction of the strap 13 is a capsule comprising a metal tube 14 containing a piezo-electric crystal 15 in the form of a bar about ⅖" long and about ⅟₁₆" by ⅟₃₂" in cross-section. The bar 15 is supported as a cantilever by being clamped at one end in a clamping member 16 and held in place by an epoxy resin. Opposed faces of the bar are metallised and the two metallised surfaces 17 are connected respectively to two conductors 18.

The tube 14 is filled with an oil of some selected viscosity and the open end is closed by a plug 18 which is sealed in place and serves to retain the oil in the cavity as a damping fluid for vibrations of the crystal 15. The complete tube 14 is sealed into a corresponding bore in the block 11.

A short output lead 21 of not more than about one foot in length carries the conductors 18 to a pre-amplifier 22 which is of conventional construction and is carried in a cylindrical case about ¾" in diameter and 3" long. The lead 21 includes a helical spring 23 in its cover so that it is fairly stiff.

From the pre-amplifier 22 a similar but longer lead 24 leads to a main amplifier 25 situated in any convenient place, the short lead 21 between the detector unit and the pre-amplifier 22 ensures that preliminary amplification occurs near the source.

The power amplifier 25 provides the power supplies for the pre-amplifier and these are carried by separate conductors in the lead 24. It also has provision for connecting the amplified output to energise a light 26, head phones 27, or a loud-speaker 28, while a switch 29 allows combinations of these three devices to be used.

The crystal bar 15 is shaped to be resonant at a frequency above about 50 cycles per second, and it seems that 57 cycles per second is a convenient frequency. If signals are produced at this frequency to set the crystal bar 15 into vibration, it is deduced that the foetal heart is beating and of course this can be indicated at any one or more of the three units coupled to the main amplifier 25.

The crystal has inherently a narrow band width and a high selectivity, and the band width is widened a little and the selectivity reduced by use of the damping fluid.

The main amplifier described includes a frequency doubler as it is convenient to have the output signal at something over 100 cycles per second which is well within the audio range.

The equipment may be arranged to give a warning signal if the foetal heartbeat disappears.

Also, a stop watch 31 can be provided for timing the pulse rate.

What we claim as our invention and desired to secure by Letters Patent is:

1. A foetal heartbeat detector including a slab member having a rigid flat surface for mounting against the mother's body, an elastic belt attached to the slab for holding the slab member in position, a capsule positioned in a cavity in the slab member, a vibratory rod of piezo-electric crystal mounted as a cantilever in the capsule with a natural vibration frequency just above 50 cycles per second, liquid in the capsule for damping vibrations of the rod and electrical conductors carried on opposed faces of the rod.

2. A detector as claimed in claim 1 including a pre-amplifier positioned adjacent the detector and connected to receive for amplification electrical signals from the said electrical conductors.

3. A detector as claimed in claim 2 including a lead connecting the slab member with the pre-amplifier, which lead contains a stiffener surrounding two conductors.

4. A detector as claimed in claim 3 including a main amplifier connected to receive as input the output from the pre-amplifier and connected to deliver amplified output to a loud-speaker, ear-phones and a lamp.

5. A foetal heartbeat detector including a slab member having a rigid flat surface and a belt for holding the slab member with its flat surface against the mother's body, a vibratory member positioned in a cavity in the slab member and comprising a rod of piezo-electric crystal mounted as a cantilever, and including electrical conductors on opposed faces of the rod, the natural vibration frequency of the rod being a little above 50 cycles per second.

References Cited by the Examiner

UNITED STATES PATENTS

| 2,001,537 | 5/35 | Mason | 179—1 |
| 2,099,938 | 11/37 | Lockhart | 179—1 |
| 2,564,562 | 8/51 | Chess | 179—1 |
| 2,777,903 | 1/57 | Turner | 179—1 |

ROBERT H. ROSE, *Primary Examiner.*

WILLIAM C. COOPER, *Examiner.*